United States Patent
Gladish et al.

(10) Patent No.: US 10,334,900 B2
(45) Date of Patent: Jul. 2, 2019

(54) MAGNETIC CLOSURES

(71) Applicant: The North Face Apparel Corp., Wilmington, DE (US)

(72) Inventors: Justin Lee Gladish, Oakland, CA (US); Mary-Ellen Smith, San Francisco, CA (US)

(73) Assignee: The North Face Apparel Corp., Wilmington, DE (US)

( * ) Notice: Subject to any disclaimer, the term of this patent is extended or adjusted under 35 U.S.C. 154(b) by 86 days.

(21) Appl. No.: 15/532,044

(22) PCT Filed: Dec. 16, 2015

(86) PCT No.: PCT/US2015/066164
§ 371 (c)(1),
(2) Date: May 31, 2017

(87) PCT Pub. No.: WO2016/100553
PCT Pub. Date: Jun. 23, 2016

(65) Prior Publication Data
US 2017/0311666 A1    Nov. 2, 2017

Related U.S. Application Data

(60) Provisional application No. 62/094,926, filed on Dec. 19, 2014.

(51) Int. Cl.
*A41F 1/00* (2006.01)
*A43C 11/00* (2006.01)
(Continued)

(52) U.S. Cl.
CPC .............. *A41F 1/002* (2013.01); *A43C 11/00* (2013.01); *F16B 1/00* (2013.01); *H01F 1/44* (2013.01);
(Continued)

(58) Field of Classification Search
CPC ................ F16B 1/00; F16B 2001/0035; F16B 2001/0036; A43C 11/00; A41F 1/002;
(Continued)

(56) References Cited

U.S. PATENT DOCUMENTS 6,742,227 B2 *   6/2004   Ulicny ............... A44B 18/0003
                                                          24/303
6,983,517 B2   10/2006   Golden et al.
(Continued)

FOREIGN PATENT DOCUMENTS

| CN | 101168090 | 4/2008 |
|----|-----------|--------|
| CN | 201445026 | 5/2010 |

(Continued)

OTHER PUBLICATIONS

Chinese Office Action in Chinese Application No. 2015800681477, dated Jul. 3, 2018, with machine English Translation, office action and translation totaling 21 pages.
(Continued)

*Primary Examiner* — Robert Sandy
(74) *Attorney, Agent, or Firm* — Ganz Pollard, LLC (57) ABSTRACT

A releasable closure having a first structure that encapsulates a magnetic composition based on magnetic particles, such as a smart fluid of the group electrorheological fluid, magnetorheological fluid, ferrofluid, or that is formed of a printable composition with dispersed magnetic particles. The first structure is magnetically attracted and thereby joinable to an opposing, second structure, with the first and second structures forming the releasable closure.

23 Claims, 6 Drawing Sheets

(51) Int. Cl.
*F16B 1/00* (2006.01)
*H01F 1/44* (2006.01)

(52) U.S. Cl.
CPC .. *A44D 2203/00* (2013.01); *F16B 2001/0035* (2013.01)

(58) Field of Classification Search
CPC ................ H01F 1/44; Y10T 24/44068; Y10T 24/45461; Y10T 24/45466
See application file for complete search history.

(56) References Cited

U.S. PATENT DOCUMENTS

| | | | |
|---|---|---|---|
| 7,344,379 | B2 | 3/2008 | Marmaropoulos et al. |
| 2005/0275243 | A1 | 12/2005 | Browne et al. |
| 2006/0112523 | A1 | 6/2006 | Deto et al. |
| 2007/0267413 | A1 | 11/2007 | Langberg |
| 2014/0049911 | A1 | 2/2014 | Corbin et al. |

FOREIGN PATENT DOCUMENTS

| | | |
|---|---|---|
| CN | 102940348 | 2/2013 |
| CN | 203913661 | 11/2014 |
| WO | 94/16587 | 8/1997 |
| WO | 2002049465 | 6/2002 |
| WO | 2005025363 | 3/2005 |
| WO | 2014059508 | 4/2014 |

OTHER PUBLICATIONS

International Search Results and Written Opinion for PCT Application No. PCT/US15/66164, dated Mar. 4, 2016, 11 pages.
International Preliminary Report on Patentability for PCT Application No. PCT/US15/66164, dated Jun. 20, 2017, 9 pages.
Extended European Search Report for European Application No. 1571013.7, dated Apr. 19, 2018, 7 pages.

* cited by examiner

MAGNETIC CLOSURES

RELATED APPLICATIONS

This application claims the benefit of and priority to U.S. Provisional Application Ser. No. 62/094,926, filed Dec. 19, 2014, the contents of which are hereby incorporated by reference as if recited in full herein for all purposes.

BACKGROUND

The inventive subject matter generally relates to closures for closing openings in, or making connections between, objects or parts thereof. The closures are magnetically based and are intended to be suitable for use as replacements for zippers and other such closures. For example, the inventive closures are suitable for use in apparel and other textile-based objects, and footwear applications.

A magnet attracts ferromagnetic materials and magnets attract magnets when opposite poles are aligned. Magnetic fields may be permanent or selectable. That is, a magnetic field may be selectively established in an object by an electric current or induced in certain materials such as smart fluids that may be magnetized when in the presence of an applied magnetic field.

All moving charged particles, such as electrical current, produce magnetic fields. Current conducted in a wire creates magnetic field lines in concentric circles around the length of the wire. Current conducted in two adjacent wires generate magnetic fields that create magnetic forces that can attract the wires together or repel the wires, depending on the relative directions of the currents.

A class of fluids (referred to herein as "smart" fluids) has properties that can be varied when subjected to external electromagnetic forces. Examples include magnetorheological (MR) fluids that change rheological behavior in response to an applied magnetic field; ferrofluids that become strongly magnetized in the presence of a magnetic field; and electrorheological (ER) fluids that respond to an electric field with a change in the fluid's viscosity.

MR fluids are suspensions of micrometer-sized, magnetically polarizable particles in oil or other liquids. When an MR fluid is exposed to a magnetic field, the normally randomly oriented particles within the fluid form chains of particles in the direction of the magnetic field lines. This alignment increases the apparent viscosity of the fluid and there is magnetization along the chains of aligned particles. MR elastomers are suspensions of micrometer-sized, magnetically polarizable particles in a thermoset elastic polymer or rubber. The stiffness of the elastomer structure may be changed by varying the strength of the applied magnetic field. MR fluids and elastomers typically change viscosity when exposed to a magnetic field in as little as a few milliseconds. Discontinuing the exposure of the MR fluid or elastomer to the magnetic field reverses the process: the fluid loses magnetism and returns to a lower viscosity state, and the elastomer returns to its lower modulus state. MR fluids enclosed in structural elements have been disclosed in U.S. Pat. No. 5,547,049.

Ferrofluid is a stable suspension of magnetic particles in a liquid carrier. The particles, which typically have an average size of about 10 nm, are coated with a surfactant that prevents the particles from agglomerating, even when a strong magnetic field is applied. A wide variety of magnetic solids, surfactants, and carriers are known and available and can be used to tailor ferrofluid properties to intended applications.

Regardless of their composition, ferrofluids generally behave the same. In the absence of a magnetic field, the magnetic moments of the particles in the ferrofluid are randomly distributed, and the fluid has no net magnetization. When a magnetic field is applied to a ferrofluid, the magnetic moments of the particles orient along the field lines and the ferrofluid becomes magnetized. Ferrofluids typically respond almost immediately to changes in the applied magnetic field and when the applied field is removed, the moments quickly randomize again. The retention force of a ferrofluid can be adjusted by changing either the composition of the fluid or the magnetic field that induces magnetization.

Electrorheological (ER) fluids are dispersions that can rapidly and reversibly vary their apparent viscosity in the presence of an applied electric field. ER fluids are dispersions of finely divided solids (<50 microns) in hydrophobic, electrically non-conducting oils that have the ability to change their rheological characteristics, even to the point of becoming solid, when subjected to a sufficiently strong electrical field. When the field is removed, the fluids revert to their normal liquid state. The current passing through the ER fluid may be extremely low and still achieve the desired state change.

"Printed electronics" refers to printing methods that create electrical devices on various substrates. Common printing equipment and processes, such as screen-printing, flexography, gravure, offset lithography, and inkjet, may be suitable for defining electrical patterns on material. Electrically functional electronic inks are deposited on the substrate creating active or passive devices such as conductors, transistors, and resistors.

A class of textiles that may include electronic circuitry is e-textiles or smart fabrics in which digital components are embedded. E-textiles include textiles with classic electronic devices such as conductors, integrated circuits, LEDs, and batteries embedded into garments and textiles with electronics integrated directly into the textile substrates. This may include passive electronics such as conductors and resistors or active components like transistors, diodes, and solar cells.

Another field in which conductors and circuits may by integrated into textiles is "fibertronics" that uses conducting and semi-conducting materials in the fabrication of a woven material. Commercial fibers such as metallic fibers can be woven or sewn as part of a garment or other textile item. Organic electronics may be suitable because they can be conducting, semiconducting, and designed as inks and plastics.

Advancements in this field are ongoing and future textiles with electromagnetic properties may be suitable for use in implementing the inventive concepts disclosed herein.

Closures couple things together and as used herein refer to apparatuses that connect one object to another object, or one portion of an object to another portion of the same object. Known examples of releasable closures include zippers, buttons, Velcro, laces, latches, magnets, and snaps. Examples of non-releasable closures, that is, closures that are intended to be long-term, include nails, screws, and most adhesives.

Releasable closures are common in clothing, footwear, camping gear such as tents, sleeping bags, and backpacks, athletic gear such as pads, helmets, and safety gear, upholstered items such as seats and couches, and a multitude of other applications in all fields of endeavor. Considerations in selecting a releasable closure for an application include its weight, resistance to abuse, resistance to environmental factors (water, dust, wind, etc.), retention strength, flexibility, aesthetics, ease of use, profile (e.g., thinness), and reliability.

Magnetic closure systems are known that are based on zipper-like, interdigitating magnetic elements. U.S. Pat. No. 6,983,517 entitled "Releasable Closure System" discloses the use of an MR fluid in the heads of interdigitating elements. Heads on an interdigitating element may include an MR fluid that can be magnetically switched on or off to change their configuration so that they engage complementary heads on an opposing interdigitating element.

Unfortunately, significant disadvantages exist for closure systems that are based on interdigitating elements. Such systems require slide closures, complicating fabrication and use. Interdigitating elements are also prone to failure. The entire closure fails if a single element fails. They are also difficult or expensive to engineer for weather resistance as each element is point of entry for moisture or air because seals are imperfect in conventional designs.

Accordingly, the art of releasable closures can benefit from a releasable closure that includes properties not found in prior art devices and that provides reliability, ease of use, resistance to environmental factors, and good retention strength.

There is also a need for garment assemblies that more securely and aesthetically couple together. And there is a need for easy to operate means for coupling garments and other objects and to open or close common openings for such objects.

The inventive subject matter disclosed herein, in its various possible embodiments and applications, addresses the foregoing and other needs and overcomes disadvantages in the prior art.

SUMMARY

The following is a short description of some of the various inventive lines under the inventive subject matter. The appended claims, as originally filed in this document, or as subsequently amended, are hereby incorporated into this Summary section as if written directly in. The following is not intended to be an exhaustive list of embodiments and features of the inventive subject matter. Persons skilled in the art are capable of appreciating other embodiments and features from the following detailed description in conjunction with the drawings.

In some embodiments, the inventive subject matter is directed to a releasable closure having a first structure that encapsulates a magnetic composition based on magnetic particles, such as a smart fluid of the group electrorheological fluid, magnetorheological fluid, ferrofluid, or that is formed of a printable composition with dispersed magnetic particles. The first structure is magnetically attracted and thereby joinable to an opposing, second structure, with the first and second structures forming the releasable closure. The second structure can be a magnetic or magnetizable structure like the first structure. Alternatively, it can be made of ferromagnetic material that is attractive to magnets but is not a magnet itself. As used herein a "compatible element" may refer to any such structure that is magnetically attracted and joinable to the first structure.

In certain of various possible embodiments, the inventive subject matter is generally directed to a releasable closure system comprising two structures having hollow portions each enclosing a smart fluid and two sources of switched electromagnetic fields wherein the switches may be operated to cause an electromagnetic field in the smart fluid thereby magnetizing the smart fluid and, when arranged appropriately, causing the structures to be attracted to each other and thereby fastened.

In another embodiment, hollow structures housing a smart fluid fit loosely into a coupling state when no (or very low) electromagnetic field is present and then couple securely when an electromagnetic field is present that causes the smart fluid to change state—from a relatively low viscosity fluid to a relatively high viscosity fluid—thereby substantially stiffening the hollow structures causing them to mechanically couple.

In another embodiment of a releasable closure employing the inventive concept elongate conductors are arranged along opposing sides of an opening and electric current is passed through the conductors creating magnetic fields around the conductors. When current passes in the same direction through the conductors the induced magnetic fields will attract and the conductors will be drawn together. If the sides of the opening are allowed to move, the induced magnetic force will fasten the sides together.

The elongate conductors may be printed electronics, e-textiles, or fibertronic materials embedded in a fabric or other textile.

The inventive subject matter may be implemented as a releasable closure for apparel, footwear, equipment, upholstered items, including, without limitation, jackets, sleeping bags, tent flaps, backpack openings, pockets, flaps, luggage and bags, footwear, furniture, cushions, and many other applications.

When used with footwear the need for laces may be eliminated and the footwear streamlined and more comfortable. In one example, the releasable closures having the inventive concept would be located between the tongue of the shoe and the sides of the upper where the two overlap. In another embodiment, the smart fluid would be encased in a hollow, strap-shaped mechanism (similar in size and dimensions to Velcro® but less bulky and more durable and less susceptible to degradation due to dirt or other contaminants). As the straps overlap and are subjected to an electromagnetic field they would become magnetized and fasten.

In another embodiment, tubing having a small diameter may be woven into a fabric in a predetermined pattern wherein the tubes encapsulate a smart fluid and a nearby switch induces an electromagnetic field whereby the tubes become magnetized. Other panels of the fabric may include similar narrow diameter tubes that are similarly magnetized and arranged to attract each other or portions of the fabric may include woven metal thread that is attracted to the magnetic field in the woven tubes.

These and other embodiments are described in more detail in the following detailed descriptions and the figures.

BRIEF DESCRIPTION OF THE DRAWINGS

The following figures show embodiments according to the inventive subject matter, unless noted as showing prior art.

DETAILED DESCRIPTION

Representative embodiments according to the inventive subject matter are shown in FIGS. 1-8 wherein the same or generally similar features share common reference numerals.

The inventive subject matter is generally directed to a releasable closure having a first structure that encapsulates a magnetic composition based on magnetic particles, such as a smart fluid of the group electrorheological fluid, magnetorheological fluid, ferrofluid, or that is formed of a printable composition with dispersed magnetic particles. The first structure is magnetically attracted and thereby joinable to an opposing, second structure, with the first and second structures forming the releasable closure.

Figure 1A:
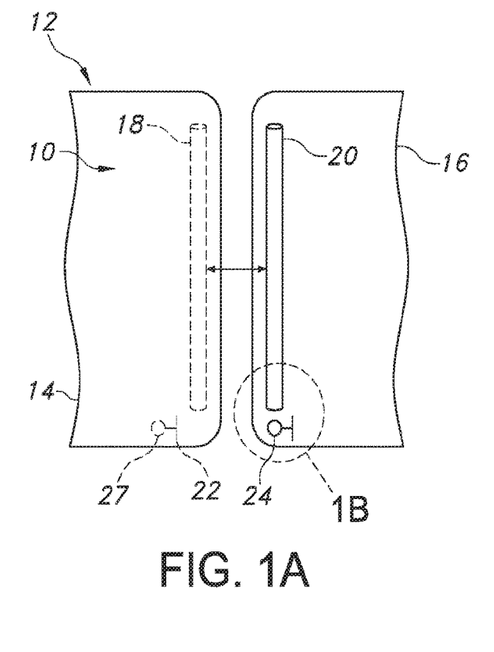
FIG. 1A shows a diagrammatic plan view of a first representative embodiment of a releasable closure.

FIG. 1 shows a representative example of a releasable closure 10 as part of a closure system 12 that includes a left panel 14 and right panel 16 supporting a first tubular element 18 and second tubular element 20, respectively. Tubular element 18 is mounted to obverse side of panel 14, as viewed in FIG. 1A, and accordingly it is shown in dotted line. The system further includes a first switch 22 and second switch 24 shown at lower ends of the respective tubular elements. Elements 18, 20 may be filled with or formed of a magnetic or magnetizable material. They may be a unitary construct that extends the full length along an opening or edge that is to be closed or joined with another object. Or they may be part of series of tubes that are spaced along an opening or along and edge and collectively create a closure or system of joining objects. For example, the single tubes shown in FIG. 1A could be broken down into multiple tubes spaced along the edges of panels 14, 16. Multiple tubes may be connected by thinner connecting tubes to conduct magnetic fields between the multiple tubes. The elements 18,20 may also have spaced-apart walls through longitudinal cross sections that create a series of independent chambers for MR fluid along the length of the elements. The independent chambers may have any desired spacing based on wall thickness and/or spacings. The closure system can also be based on other geometric forms that can interdigitate upon the magnetization of a smart fluid in opposing housings or containers.

The left and right panels 14, 16 may be fabric, leather, polymer, e.g., plastics, or other material, or any other moveable parts that are desired to be fastened together. Exemplarily, the left and right panels may be the sides of a shirt or jacket that are desirably fastened when donning and unfastened to doff. Alternatively, the panels may be a lateral or medial side and a tongue of footwear, or portions of a sleeping bag. The releasable closure according to the inventive concept may be used to fasten any suitable moveable pieces.

Figure 1B:
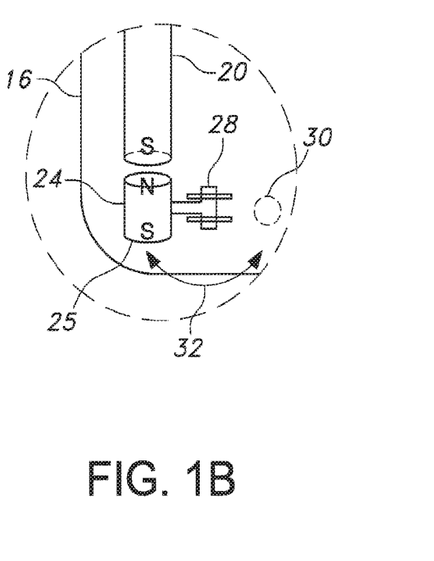
FIG. 1B shows an enlarged plan view of a portion of the first representative embodiment shown in FIG. 1A.
Figure 1C:
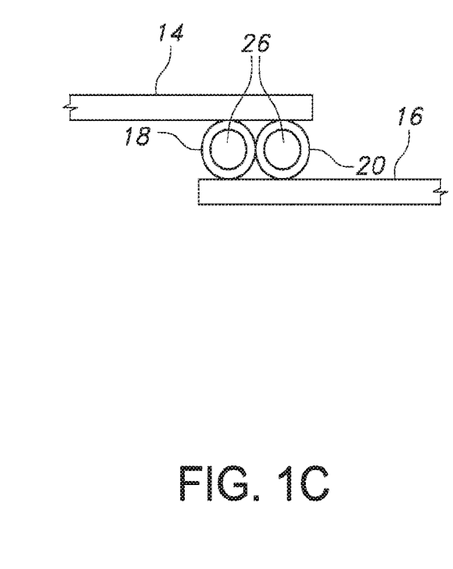
FIG. 1C shows a cross sectional view of the first embodiment wherein sides of the system are fastened.

The tubular elements 18, 20 may be flexible polymer tubes or tubes of waterproof fabric or other material that will securely contain a fluid 26 (fluid 26 is shown in the cross-section view of FIG. 1C residing in the center void of the tubular elements). The center void need not extend the length of a tube and may extend only partially along the length thereof.

Elements 18 and 20 may be referred to as "tubular" elements; however, the cross-sectional shape need not be circular and may instead be oval, triangular, rectilinear, or other suitable shape. Non-symmetrical shapes may provide advantages in particular configurations. Examples of non-symmetrical shape are a teardrop shape or a cross-section with undulations.

Oval cross-sectional elements would mean the elements 18 and 20 would be flatter elements (relative to circular cross-section elements of the same volume). Overlapping them would increase the area of contact between the elements, thereby affecting the closure force. The elements 18, 20 may vary in width and thickness (allowing for control of the amount of fluid 26) to control the amount of attraction and strength of attraction between the sides. Combinations of elements having different cross-sections may also be used, e.g., element 18 may be flat element with an oval cross-section, and element 20 may be a tube with a circular cross-section, or alternately element 18 may have a circular cross-section and element 20 may have an undulating cross-section that cups element 18.

Elements 18, 20 may directly or indirectly attach or integrate with panels 14, 16. For example, the inventive subject matter contemplates that the tubes 18, 20 may indirectly attach to the panels using an intermediate structure. For example, tubes 18, 20 could be disposed on a tape (e.g., a strip of fabric) like the kind used is supporting conventional zipper teeth. The tapes with tubes 18, 20 can be stitched to the edges of an opening for a garment or other object, for example. Accordingly, the inventive subject matter contemplates a standalone construct comprising a magnetic closure such as tubes 18, 20 filled with a smart fluid and a supporting substrate such as a tape. It is also contemplated that a tubular element could be formed as part of unitary structure with a panel. For example, the entire panel and tubing could be printed in a 3D printing process or formed in a molding process.

Although tubes 18, 20 are shown as straight, cylindrical tubes, they may have other configurations. For example, they may have non-circular cross-sections, as noted above, and they may vary in cross-section size and profile along their length. They may have a shape that provides higher surface area than cylinders for male-female engagement. For instance, the opposing sides could have undulating profiles, with the peak of a section on one tube being complementary with a trough on an opposing section on the other tube. Operation of the closure is improved where the tubes 18 and

20 do not have incompatible shapes or arrangement; for example, if one tube is straight and arranged vertically and the other is undulating and arranged off the vertical then closure may be diminished. Thus, compatible shapes and arrangements of tubes 18, 20 are preferred.

Fluid 26 is a smart fluid, meaning herein a fluid whose properties change in the presence of a magnetic or electromagnetic field. Since all electric current induces a magnetic field and vice-versa, reference herein to electromagnetic fields refers to a field that is primarily an electric field or primarily a magnetic field or any combination of electric and magnetic fields.

Smart fluids include ferrofluids that are liquids that become magnetized in the presence of a magnetic field. Ferrofluids usually do not retain magnetization in the absence of an externally applied electromagnetic field.

Smart fluids include magnetorheological (MR) fluids that greatly increase its apparent viscosity, to the point of becoming a viscoelastic solid, when subjected to an electromagnetic field. The main difference between ferrofluids and MR fluids is the size of suspended particles.

Smart fluids also include electrorheological (ER) fluids that are suspensions of extremely fine non-conducting particles (up to 50 µm or thereabout) in an electrically insulating fluid. The apparent viscosity of ER fluids changes reversibly, and substantially, e.g., by an order of 100K, in response to an electromagnetic field. A typical ER fluid can go from a relatively low viscosity liquid to a relatively high viscosity of a gel, and back, with response times of milliseconds.

FIG. 1B shows an enlarged view of the switch 24 (which is also representative of switch 22). In this embodiment, switch 24 is a permanent magnet 25 mounted on a swivel base 28. An optional retainer, e.g., a retaining magnet 30 is shown in dotted line to represent that it is mounted behind panel 16. Arrow 32 shows the movement of switch 24 from an actuating position (at the left in this diagrammatic representation) to a non-actuating position (to the right). In the non-actuating position, retaining magnet 30 retains the switch and prevents it from moving unintentionally to the actuating position. The retainer need not be a magnet but could be another system for retaining the switch in an off position. For example, the switch and retainer can be configured as inter-engaging parts, e.g., snap fasteners.

The magnets 30 or other retaining system are chosen to have sufficient magnetic strength to hold the switch in the non-actuated position through an intended use of the closure system.

When switch 24 is moved into the actuating position, as shown in FIG. 1B, the permanent magnet 25 is positioned proximate the second tubular element 20 and the smart fluid 26 in the tubular element comes within the permanent magnet's magnetic field thereby inducing a phase change wherein the smart fluid becomes magnetized. As shown in FIG. 1B, permanent magnet 25 is oriented with its north pole up and near the tubular element thereby creating a south pole in the column of smart fluid at the point closest to the permanent magnet. The opposite end of the column of smart fluid would thus become the north pole, as magnetized.

On the opposing left panel 14, the switch 22 has a similar structure and componentry as switch 24, but its permanent magnet 27 is arranged with its south pole up and nearest to the first element 18 thus magnetizing the column of smart fluid in the first element with its north pole near the switch 22 and its south pole at the opposite end.

When switches 22 and 24 are positioned in their actuating positions, closest to the respective elements 18 and 20, the columns of smart fluid in the tubular elements become magnets having their poles arranged oppositely, that is, the north pole of the smart fluid in one element is opposite the south pole of the smart fluid in the other element and the columns of smart fluid are now magnetically attracted to each other and fasten, as shown in FIG. 1C, thereby coupling the left and right panels 14, 16 together.

When the switches 22, 24 are moved away from their actuation positions, the magnetic fields of the permanent magnets 25, 27 are moved away from the columns of smart fluid and the smart fluids lose their magnetic properties, thus unfastening the system and allowing the panels to easily decouple.

The strength of the magnetic attraction between the columns of smart fluid in the first and second tubular elements may be controlled by the strength of the permanent magnets 25, 27, the amount and type of smart fluid in the tubular elements, and the structure of the tubular elements (e.g., thinner walls would permit greater proximity and thus a stronger magnetic coupling). The selection of the strength for the magnetic attraction may depend upon the application for the closure system; for example, footwear may require greater closure retention strength than perhaps the opening of a purse.

Figure 2:
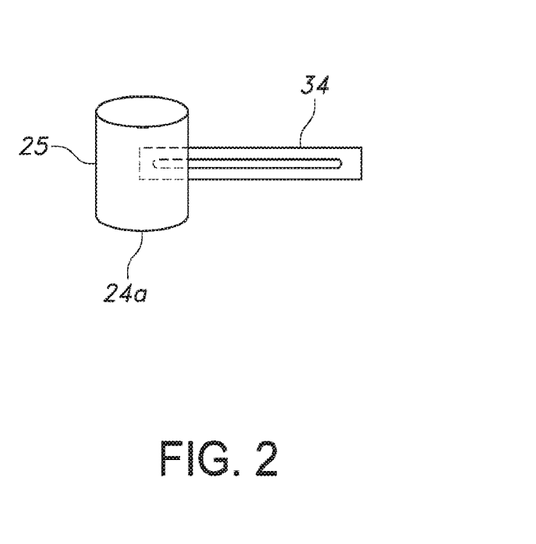
FIG. 2 shows a diagrammatic plan view of a second representative embodiment of a switch assembly.

FIG. 2 shows an embodiment wherein the switch 24a mounts the permanent magnet 25 in a slider mechanism 34 so that the magnet 25 may slide left to right to control whether the smart fluid is magnetically actuated. Alternatively, a slider mechanism may move the magnet up and down.

Alternatively to the permanent magnets 25, 27, electromagnets may be employed. Batteries or other power source may be located, for example, on the respective panels 14, 16 to actuate the electromagnets to induce the magnetic fields in the respective columns of smart fluid. When electromagnets are employed, there is no need to physically move the electromagnets toward or away from the tubular elements. Rather, the electromagnets may be fixedly attached to the respective panels near the tubular elements. The strength of the electromagnetic field would affect the retention strength of the closure.

It should be appreciated that the actuating magnets, whether permanent magnets or electromagnets, may be positioned at either end of the tubular elements. Also, either panel 14, 16 may have the smart fluid's north pole up or down so long as the opposing smart fluid is arranged opposite. The permanent magnets may also be positioned at intermediate positions along the lengths of elements 18 and 20. Further, the elements 18 and 20 may have a dogleg at either end, and the permanent magnets arranged proximate the dogleg ends, so as to prevent possible interference of the magnetic field of one magnetic switch with the other magnetic switch. Possible interference of the switches may also be controlled with a magnetically insulating material.

Further, an embodiment may employ one tubular element with smart fluid and position a ferromagnetic material on the opposing panel wherein by magnetizing the smart fluid in the tubular element it thereby becomes attracted to the ferromagnetic material and fastens to it.

Figure 3:
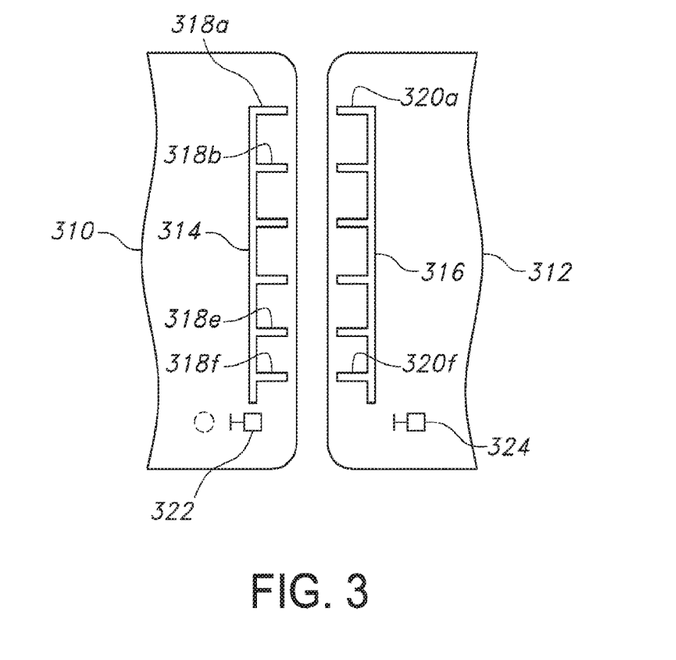
FIG. 3 shows a diagrammatic plan view of a second representative embodiment of a releasable closure.

FIG. 3 shows an embodiment wherein a first panel 310 has a tubular element 314 with projections 318a-318f (not all reference numbers indicated) and a second panel 312 has tubular element 316 with projections 320a-320f (not all reference numbers indicated). Tubular elements 314 and 316 are in fluid communication with their respective projections 318a-f and 320a-f, which magnetically attract one another. A smart fluid is encapsulated within each tubular element. Switches 322, 324 are located near the tubular elements and may be moved from an actuating position (switch 322 is shown in the actuating position) and a non-actuating position (switch 324 is shown in a non-actuating position). In the actuating positions permanent magnets associated with the switches magnetize the smart fluid in the respective tubular elements and as described above, the magnets are arranged to magnetize the smart fluid so that their respective magnetic poles are opposite and the tubular elements are in magnetic attraction and fasten. Moving the switches to the non-actuating position demagnetizes the smart fluid and unfastens the system. An advantage of this system is that it orients projections 318a-f and 320a-f transversely to the edges of the panels 310 and 312 so that the panels are more flexible when the closure system is actuated. This type of closure system may have advantages for use in outdoor and active wear because users may engage in various movements that require flexibility. (As noted, the smart fluids may become more viscous and thereby stiffen when magnetized.) Additionally, elements 314 and 316 may be thinner in cross-section than the projections 318a-f and 320a-f to further facilitate flexibility.

Figure 4A:
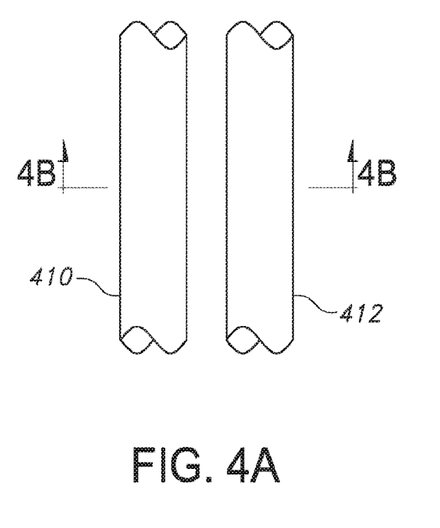
FIG. 4A shows a diagrammatic view of tubular elements of a representative embodiment and FIG. 4B shows a cross section of the tubular elements.
Figure 4B:
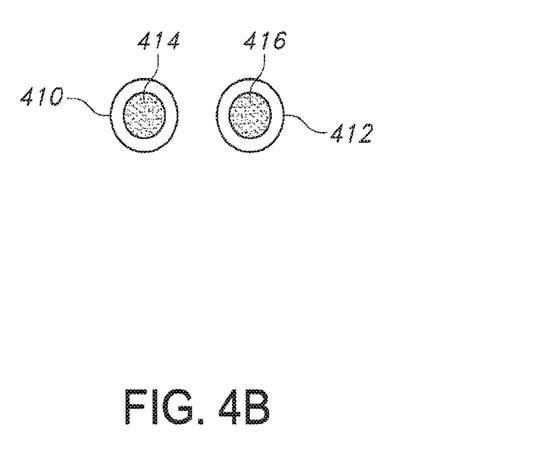

FIGS. 4A and 4B show one embodiment of tubular elements 410, 412, exemplary of tubular elements 18, 20 and 314, 316 described above. The tubular or other housing elements may be any material capable of retaining a liquid without substantial discharge from the housing. A common example is a polymer tubing. Each tubular element encapsulates a column of smart fluid 414, 416 as indicated in the cross-section view of FIG. 4B. The tubular elements have a tubular wall thickness that will affect the stiffness of the tubular element and the proximity into which the columns of smart fluid can be, and therefor affect the strength of a closure employing these elements—the magnetic attraction and hence the closure retention strength of two magnets is determined in part by their proximity. The tubular elements may be located in a fabric sleeve (not shown) for aesthetic appeal and/or for ease of attachment to panels to which they may be fastened. The tubular elements in FIGS. 4A and 4B are shown with a circular cross-section, but, as indicated above, other embodiments may have non-circular cross-sections including cross-sections that are square, oval, star-shaped, triangular, etc.

Figure 5A:
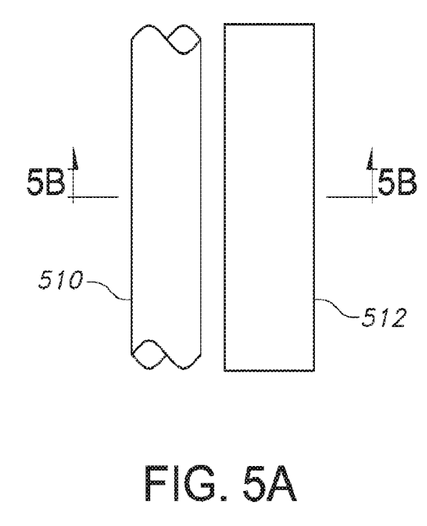
FIG. 5A shows a diagrammatic view of hollow elements of a representative embodiment.
Figure 5B:
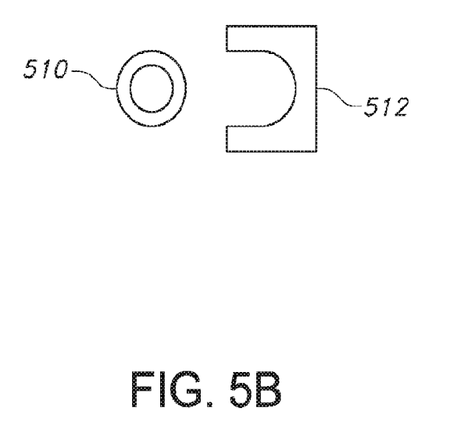
FIG. 5B shows a cross section of those elements.

FIGS. 5A and 5B show hollow element 510 and a hollow receiving element 512 that receives element 510. FIG. 5B shows hollow element 510 as a tubular structure sized to fit within receiving element 512.

As noted, a property that may be affected when an applied electromagnetic field is applied to a smart fluid is an increase in the viscosity of the smart fluid thereby stiffening the smart and the structure enclosing the fluid. The embodiments of FIGS. 5a and 5b take advantage of this stiffening to create a mechanical fastening of the respective hollow elements. In FIG. 5b the elements may easily or loosely press fit together but in the presence of an electromagnetic force the stiffening of the smart fluid causes the receiving element to more firmly grip the smaller element or the smaller element to resist deformation that would allow it to easily move out of the receiving element. In embodiment where both elements 510 and 512 house smart fluids and those fluids are magnetized with opposing magnetic poles, then the elements are coupled by magnetic attraction and a mechanical fastening. Where only one element houses a smart fluid, e.g., receiving element 512, the elements will be fastened by mechanical fastening only.

Figure 6A:
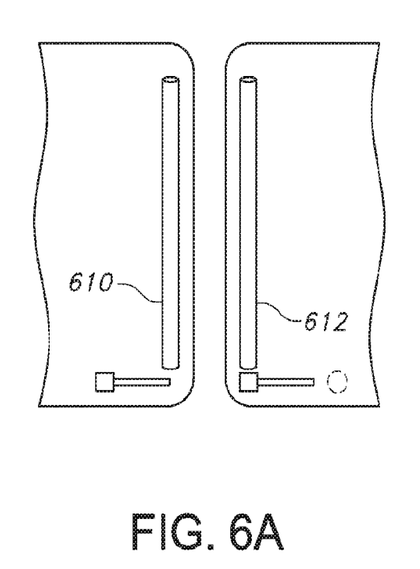
FIG. 6A shows a diagrammatic plan view of an embodiment of a representative embodiment of a releasable closure.
Figure 6B:
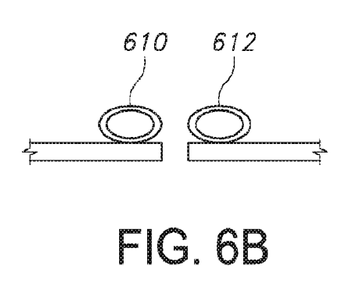
FIG. 6B shows a cross section view of the embodiment along line 6-6 and FIG. 6C shows the sides of the embodiment fastened.
Figure 6C:
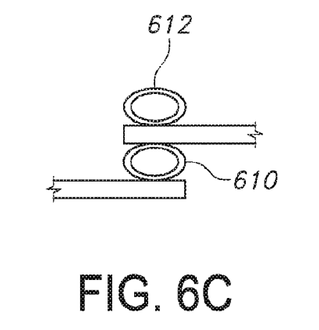

FIGS. 6A-6C show an embodiment wherein hollow elements 610 and 612 are shown to have an oval cross-section that facilitates stacking the element when fastened together. The hollow elements 610 and 612 encapsulate a smart fluid and are actuated and fastened in the manner described above. Alternatively, element 610 or 612 may encapsulate a smart fluid and the other element may be a magnetizable material such as a ferromagnetic material. In all cases of ferromagnetic materials, these may be metallic fibers, yarns, or printed films of varying thickness and width and materials, some rare earth materials, e.g., neodymium, that are attracted to magnet potentials. While FIG. 6C shows one panel between the elements 610 and 612, the panels may be arranged so that the elements are in direct, stacked contact.

Figure 9:
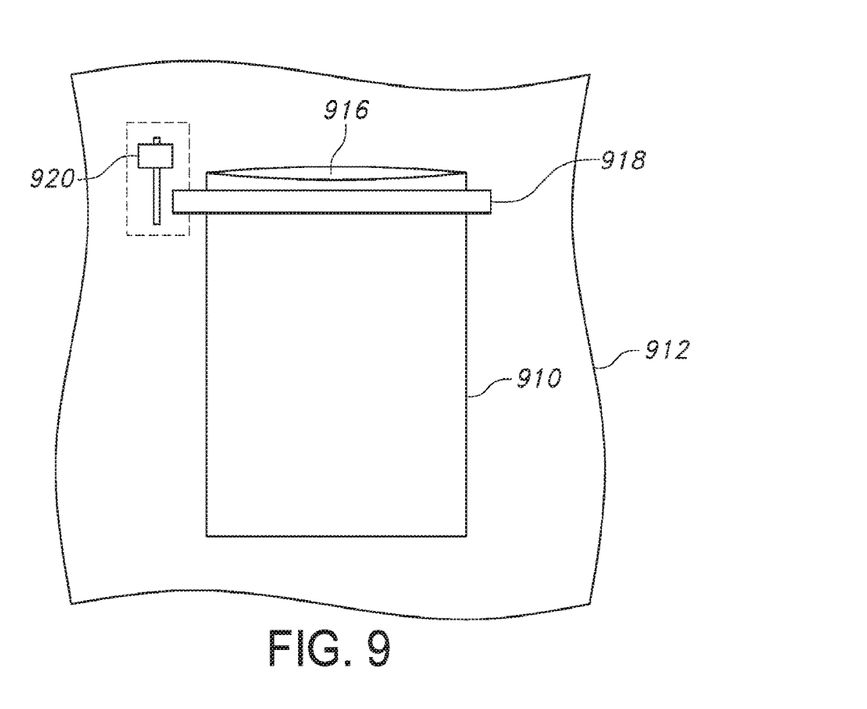
FIG. 9 shows a diagrammatic view of a pocket attached to a substrate material and having an embodiment used structurally to control access to the pocket.
Figure 10:
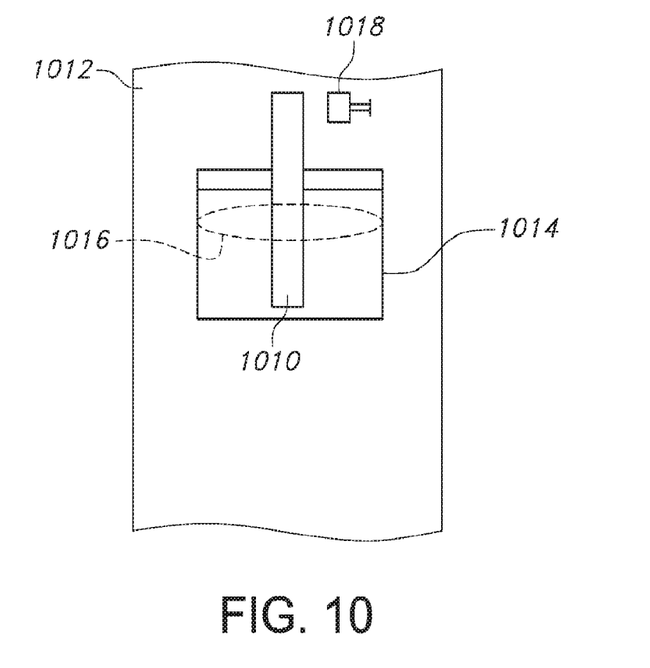
FIG. 10 shows a diagrammatic view of a pocket flap attached to a substrate material and having an embodiment used structurally to control access to the pocket.

The increase in viscosity may be employed for its structural benefit, as well as its use as a closure mechanism, as shown in FIGS. 9 and 10.

FIG. 9 shows a diagrammatic view of a container, e.g., a pocket 910 attached to a substrate material 912 such as fabric or synthetic fabric. The top of the pocket defines an opening 916. A closure element 918 having structure enclosing a smart fluid may be positioned along a perimeter of the top of a pocket. When the smart fluid is not magnetized the pocket opening is flexible and contents of the pocket are easily accessed. When a permanent magnet such as magnet 920 is moved close to the closure element 918 the smart fluid is magnetized and the element 918 becomes relatively rigid and limits access to the pocket by restricting spreading or expansion of the opening.

In another example shown in FIG. 10, a closure element 1010 may be attached to a substrate material 1012 and routed down a flap, e.g., a pocket flap 1014 that covers a container, e.g., pocket opening 1016. When smart fluid, enclosed in the closure element 1010 is non-magnetized, the flap is flexible and may be bended to access the underlying pocket opening, but when the smart fluid is magnetized by a moveable permanent magnet 1018 the closure element 1010 becomes relatively rigid and thereby holds the flap 1014 in place inhibiting access to the pocket.

Closure elements such as 918 and 1010 may also be fashioned as a selectable stay. For example, a stay could be used to hold a bag open when the smart fluid is magnetized or to hold a backpack's shoulder strap outward for easier donning of the backpack.

Figure 11:
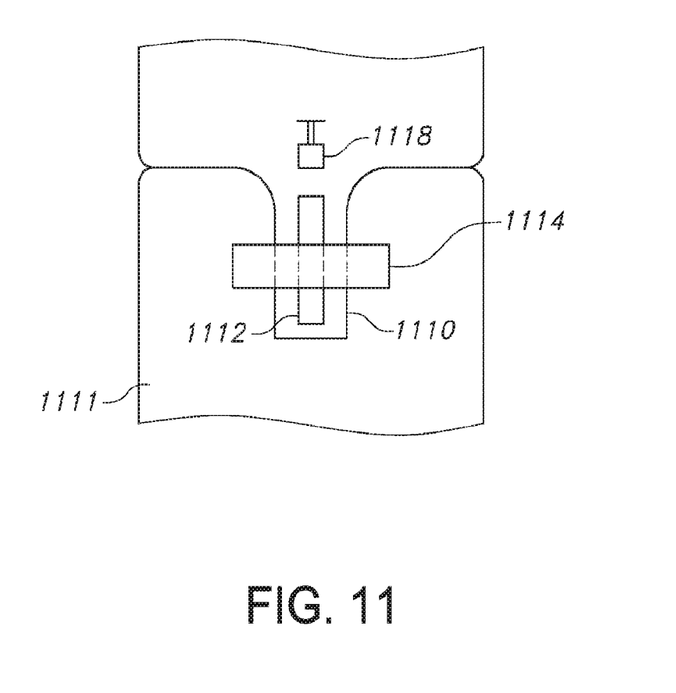
FIG. 11 shows a diagrammatic view of a flap engaged with a retaining strap that is attached to a substrate material.

Another example, shown in FIG. 11, may include a fabric tongue 1110. The tongue is movably associated with a substrate 1111. The tongue may serve to cover or fill in an opening (not shown) in the substrate. The tongue has an affixed or integrated closure element 1112 along a length thereof. The tongue may optionally fit into a slot or beneath a strap 1114. The closure element 1112 encapsulates a smart fluid. When the smart fluid is not magnetized, the tongue with element 1112 is flexible and is easily movable relative to the substrate. If optional slot or strap 1114 is used, the tongue may be easily engaged into a slot or beneath the strap 1114 when not magnetized. But when the smart fluid is magnetized by magnet 1118 the closure element 1112 becomes relatively rigid and inhibits movement, flexing, or disengagement of the tongue. Substrate 1111 may represent the upper of an item of footwear and tongue 1114 may be a tongue associated with an opening in the upper, as in a standard footwear construction.

The description of using the change of viscosity for its structural benefits, described by reference to exemplary elements 918, 1010, and 1112, is not intended to limit such use of the structural benefits to those configurations and the described and other embodiments may employ the elements described above having other cross-sections and configurations.

Figure 7A:
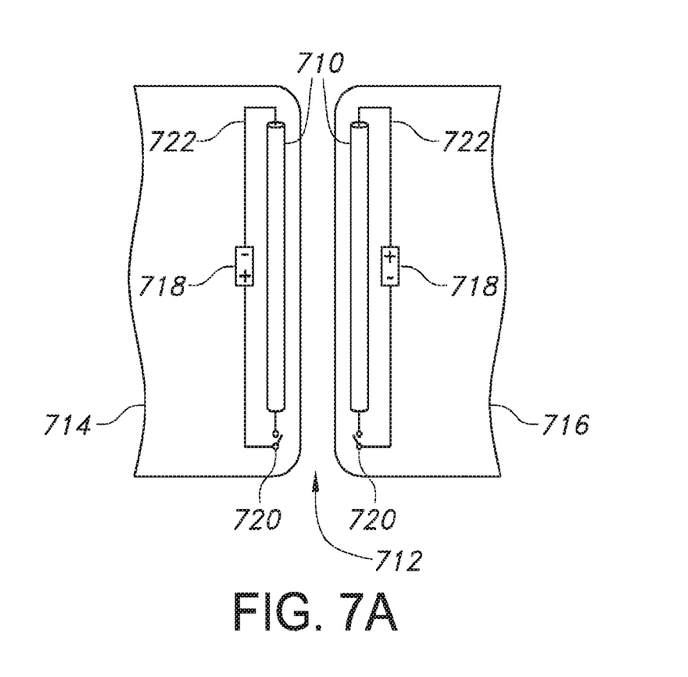
FIG. 7A shows a diagrammatic plan view of a representative embodiment of a releasable closure.
Figure 7B:
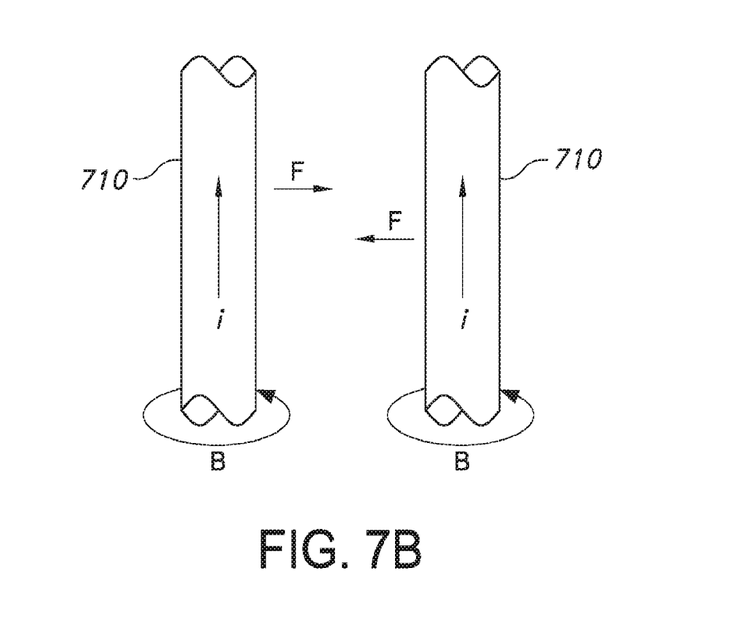
FIG. 7B shows detail of the embodiment of 7A.

FIG. 7A shows an embodiment in which the attracting magnetic fields are created by electric current. In FIG. 7A an elongate conductor 710 is arranged on sides of an opening 712 on panels 714 and 716 along with power supplies 718 and switches 720 that open and close a circuit through respective conductors, power supplies, and wires 722. When the switches are "open" that is positioned to open the circuit no current passes through the conductors. When the switches are "closed" the circuit is closed and current passes through the conductors from respective power supplies. Current in the conductor induces a magnetic field, as shown in the detail representation in FIG. 7B where current i induces magnetic fields B that generate magnetic forces F attracting the conductors 710 and connected panels 714 and 716 together. Opening the switches opens the circuit and the magnetic forces drop to zero. Accordingly, controlling the switch and current in the conductors creates a releasable closure.

Power supplies 718 may be any suitable electrical storage device, such as a battery. In embodiments where panels 714 and 716 are portions of the same item, a single power supply may be used instead of separate power supplies shown in FIG. 7A. Additionally, power generators may be included, such as photovoltaic cells, to generate electrical energy for the power supplies. Also, additional circuitry, such as resistors, diodes, or potentiometers, may be desirable to provide additional control to the circuit or for safety.

Conductors 710 and wires 722 may be wire conductors attached to the panels or printed circuits applied to the panels by processes such as such as screen printing, flexography, gravure, offset lithography, inkjet, and 3D printing (hereinafter, such techniques or products of the same may be referred to as "printing", "printed", or other variation of the word "print"). Similarly, the power supplies may be printed electronics or available battery technology. Printed electronic technology may also provide resistors and other electrical devices. Alternatively, the conductors, switches, power supplies, and other circuitry may be fibertronic materials or e-textiles. This embodiment also includes the use of one electromagnet on one side and a magnetically attractive ferromaterial on the opposing closure side. To allow for better fabric and closure flexibility, these printed circuits can be arranged in the shape of for example, a ladder, or any non-linear pattern as long as each printed layer is connected to the same wired (printed or fiber based) electrical current. This concept is previously described in for the tubular arrays encasing fluid.

Figure 8A:
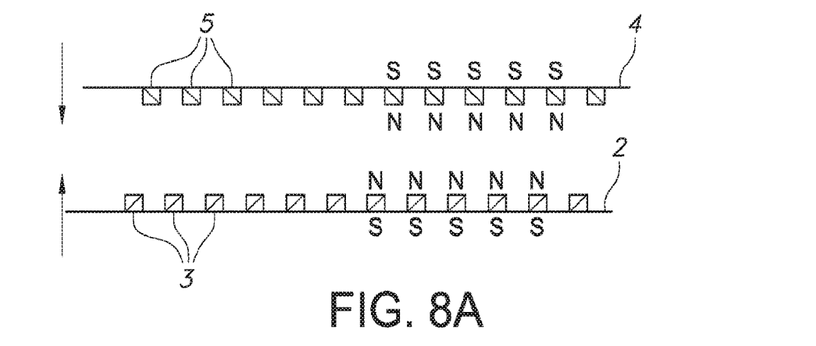
FIG. 8A shows a diagrammatic plan view of another representative embodiment of a releasable closure with halves of the closure system separated.
Figure 8B:
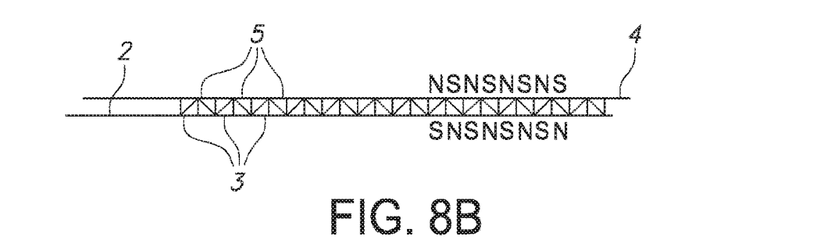
FIG. 8B shows detail of the embodiment of 8A as opposing halves of the closure are joined.

In addition to printed conductors, the inventive subject matter is also directed to printing permanent magnets arranged as interdigitating elements. FIGS. 8A-8B show one possible example. The printed magnets shown interdigitating in FIGS. 8A-8B may be made using inks, pastes, paints, sprays, depositions (e.g., chemical vapor deposition, plasma deposition), etc. of materials having magnetic particles. Examples of such materials, printing techniques, magnetic particle compositions, and related structure are known and disclosed in, for example, U.S. Pat. Nos. 5,682,670 and 7,229,746, which are hereby incorporated by reference in their entireties for all purposes.

Referring to FIG. 8A, a supporting substrate 2 with its predetermined pattern of printed magnet segments 3 has positioned thereabove a complementary supporting substrate 4 with magnet segments 5 printed in a predetermined pattern thereon. Supporting substrate 2 may attach directly or indirectly to the edges of a closeable opening. That is the supporting substrate could be an elongate strip of material that is directly stitched, glued, fused, etc., to joinable edges of a garment or other closeable object. Or it could be first attached to another structure such as a zipper tape, which then is directly attached to the joinable edges on the object.

In other advantageous embodiments, forming a supporting substrate separate from the closeable object is unnecessary, sparing manufacturing steps and materials. Instead, interdigitating magnetic elements are formed directly on joinable edges of the closeable object, eliminating the need for any separate supporting substrate and tape.

In FIG. 8A, the printed magnet segments 5 on supporting substrate 4 are magnetized so that the North poles of the magnets face downwards and the South poles of the magnets face upwards. Thus, the printed pattern on supporting substrate 4 is complementary to that on supporting substrate 2.

FIG. 8B illustrates the interdigitation of the magnets on supporting substrates 2 and 4. Notably, in the finished supporting substrate, e.g. a tape or garment edges, segments 3 interdigitably alternate with segments 5 along the length of the supporting substrate.

Suitable magnetic printing media include magnetic particle dispersed in liquids, pastes, and powders. The carrier of the particles may be organic or inorganic substances, including, for example, meltable polymers, epoxies, and ceramic powders.

As indicated, releasable closures are used in many things from everyday items to specialized tools. The releasable closures employing the inventive concept disclosed herein may similarly be useful in a very wide range of products. As a closure for sleeping bags the releasable closures disclosed herein may be advantageous over zippers because they will not catch on the surrounding loose fabric. As a closure for footwear the releasable closures disclosed herein may be more comfortable and easier to operate than laces. As a closure for backpack openings, the releasable closures disclosed herein may be more reliable and secure when wet or dirty than Velcro®. Numerous additional advantages will be apparent to the person skilled in the art.

The figures that are a part of this specification do not represent a particular scale or relative size. All figures are representative only and do not depict actual items or products. Environmental aspects of the embodiments may not be represented where not germane to the description of the embodiments or where such depiction would obscure representation of aspects of the description.

As used herein, "and/or" means "and" or "or", as well as "and" and "or."

Any and all patent and non-patent literature cited herein is hereby incorporated by references in its entirety for all purposes.

The principles described above in connection with any particular example can be combined with the principles described in connection with any one or more of the other examples. Accordingly, this detailed description shall not be construed in a limiting sense, and following a review of this disclosure, those of ordinary skill in the art will appreciate the wide variety of systems that can be devised using the various concepts described herein. Moreover, those of ordinary skill in the art will appreciate that the exemplary embodiments disclosed herein can be adapted to various configurations without departing from the disclosed principles.

The previous description of embodiments is provided to enable any person skilled in the art to make or use the disclosed innovations. Various modifications to those embodiments will be readily apparent to those skilled in the art from the teachings herein, and the generic principles defined herein may be applied to other embodiments without departing from the spirit or scope of this disclosure. Thus, the claimed inventions are not intended to be limited to the embodiments shown herein, but are to be accorded the full scope consistent with the language of the claims. In the claims reference to an element in the singular, such as by use of the article "a" or "an" is not intended to mean "one and only one" unless specifically so stated, but rather "one or more."

All structural and functional equivalents to the elements of the various embodiments described throughout the disclosure that are known or later come to be known to those of ordinary skill in the art are intended to be encompassed by the features described and claimed herein. Moreover, nothing disclosed herein is intended to be dedicated to the public regardless of whether such disclosure is explicitly recited in the claims. No claim element is to be construed as "a means plus function" claim under US patent law, unless the element is expressly recited using the phrase "means for" or "step for."

The inventors reserve all rights to the subjects matter disclosed herein, including the right to claim all that comes within the scope and spirit of the following claims, as well as any other inventive subject matter not disclose at this time.

We claim:

1. A releasable closure for connecting a first part to a second part along a predetermined length thereof, comprising:
   a. a first element coupled to the first part and encapsulating a smart fluid and extending along the predetermined length;
   b. a compatible element coupled to the second part and extending along the predetermined length;
   c. a switch for selectively inducing an electromagnetic field in the smart fluid thereby changing the state of the fluid and causing the first element to couple to the compatible element uniformly along the predetermined length;
   wherein the smart fluid is any fluid whose magnetism changes in the presence of an electric field or a magnetic field; and
   wherein the first part and second parts comprise sections of an article of apparel, footwear, or equipment.

2. The releasable closure of claim 1 wherein the smart fluid is any fluid whose properties change in the presence of an electric field.

3. The releasable closure of claim 1 wherein the smart fluid is any fluid whose properties change in the presence of a magnetic field.

4. The releasable closure of claim 1 wherein the smart fluid is any fluid whose viscosity changes in the presence of an electric field.

5. The releasable closure of claim 1 wherein the smart fluid is any fluid whose viscosity changes in the presence of a magnetic field.

6. The releasable closure of claim 1 wherein the smart fluid is any fluid of the group of electrorheological fluid, magnetorheological fluid, and ferrofluid.

7. A releasable closure for connecting a first part to a second part along a predetermined length thereof, comprising:
   a. a first element coupled to the first part and encapsulating a smart fluid and extending along the predetermined length;
   b. a compatible element coupled to the second part and extending along the predetermined length;
   c. a switch for selectively inducing an electromagnetic field in the smart fluid thereby changing the state of the fluid and causing the first element to couple to the compatible element uniformly along the predetermined length; and
   wherein the smart fluid is any fluid whose magnetism changes in the presence of an electric field.

8. The releasable closure of claim 7 wherein the switch includes a permanent magnet.

9. The releasable closure of claim 7 wherein the switch includes an electromagnet.

10. A releasable closure for connecting a first part to a second part along a predetermined length thereof, comprising:
   a. a first element coupled to the first part and encapsulating a smart fluid and extending along the predetermined length;
   b. a compatible element coupled to the second part and extending along the predetermined length;
   c. a switch for selectively inducing an electromagnetic field in the smart fluid thereby changing the state of the fluid and causing the first element to couple to the compatible element uniformly along the predetermined length; and
   wherein the smart fluid is any fluid whose magnetism changes in the presence of a magnetic field.

11. A releasable closure for connecting a first part to a second part along a predetermined length thereof, comprising:
   a. a first element coupled to the first part and encapsulating a smart fluid and extending along the predetermined length;
   b. a compatible element coupled to the second part and extending along the predetermined length;
   c. a switch for selectively inducing an electromagnetic field in the smart fluid thereby changing the state of the fluid and causing the first element to couple to the compatible element uniformly along the predetermined length; and
   wherein the compatible element encapsulates a smart fluid and further including a second switch for inducing an electric or magnetic field in the smart fluid in the compatible element.

12. The releasable closure of claim 11 wherein the switches can be actuated to cause a magnetic field near the first element and compatible element thereby magnetizing the smart fluid in the first element and the compatible element and the first element, compatible element, first switch, and second switch are arranged so that poles of the magnetized smart fluid in the first element and compatible element are opposite.

13. A releasable closure for connecting a first part to a second part along a predetermined length thereof, comprising:
   a. a first element coupled to the first part and encapsulating a smart fluid and extending along the predetermined length;
   b. a compatible element coupled to the second part and extending along the predetermined length;
   c. a switch for selectively inducing an electromagnetic field in the smart fluid thereby changing the state of the fluid and causing the first element to couple to the compatible element uniformly along the predetermined length; and
   wherein the switch induces the first element to become magnetized and the compatible element is a material attracted to a magnet.

14. A releasable closure for connecting a first part to a second part along a predetermined length thereof, comprising:
   a. a first element coupled to the first part and encapsulating a smart fluid and extending along the predetermined length;
   b. a compatible element coupled to the second part and extending along the predetermined length;
   c. a switch for selectively inducing an electromagnetic field in the smart fluid thereby changing the state of the fluid and causing the first element to couple to the compatible element uniformly along the predetermined length; and
wherein the first part is a fabric and the first element is tubular.

15. A releasable closure for connecting a first part to a second part along a predetermined length thereof, comprising:
   a. a first element coupled to the first part and encapsulating a smart fluid and extending along the predetermined length;
   b. a compatible element coupled to the second part and extending along the predetermined length;
   c. a switch for selectively inducing an electromagnetic field in the smart fluid thereby changing the state of the fluid and causing the first element to couple to the compatible element uniformly along the predetermined length; and
wherein the compatible element is shaped to receive the first element when the elements are comparatively flexible and to fasten to the first element when the first element is comparatively stiff due to the change in state of the fluid induced by actuation of the switch.

16. A releasable closure for connecting a first part to a second part along a predetermined length thereof, comprising:
   a. a first element coupled to the first part and encapsulating a smart fluid and extending along the predetermined length;
   b. a compatible element coupled to the second part and extending along the predetermined length;
   c. a switch for selectively inducing an electromagnetic field in the smart fluid thereby changing the state of the fluid and causing the first element to couple to the compatible element uniformly along the predetermined length; and
wherein the first element is shaped to receive the compatible element when the elements are comparatively flexible and to fasten to the compatible element when the first element is comparatively stiff due to the change in state induced by actuation of the switch.

17. A releasable closure having a predetermined length, comprising:
   a. a first structure having a void therein, the first structure having a length at least as long as the predetermined length;
   b. a second structure having a void therein, the second structure having a length at least as long as the predetermined length;
   c. a smart fluid located in the respective voids of the first and second structures, the smart fluid being of the class of fluids whose properties can be changed by application of an electric or magnetic field;
   d. a first switch located proximate the first structure;
   e. a second switch locate proximate the second structure;
   f. and wherein actuation of the first switch magnetizes the smart fluid in the first structure and actuation of the second switch magnetizes the smart fluid in the second structure so that the first and second structures are magnetically attracted together along the predetermined length.

18. The releasable closure of claim 17 wherein the first and second structures are tubular and the smart fluid fills the voids therein.

19. The releasable closure of claim 17 wherein the smart fluid is any fluid of the group of electrorheological fluid, magnetorheological fluid, and ferrofluid.

20. The releasable closure of claim 17 wherein the first structure receives at least a portion of the second structure and actuation of the first switch also increases the viscosity of the smart fluid in the first structure thereby causing the first structure to mechanically fasten to the second structure.

21. A releasable closure for connecting a first part to a second part along a predetermined length thereof, comprising:
   g. a first element coupled to the first part and encapsulating a smart fluid and extending along the predetermined length;
   h. a compatible element coupled to the second part and extending along the predetermined length;
   i. a switch for selectively inducing an electromagnetic field in the smart fluid thereby changing the state of the fluid and causing the first element to couple to the compatible element uniformly along the predetermined length; and
further comprising a power supply and wherein the first element is a conductor and the first switch closes a circuit thereby conducting current through the conductor generating a magnetic force and the second element is a ferromagnetic material attracted to the magnetic force.

22. A releasable closure for connecting a first part to a second part along a predetermined length thereof, comprising:
   a. a first element coupled to the first part and encapsulating a smart fluid and extending along the predetermined length;
   b. a compatible element coupled to the second part and extending along the predetermined length;
   c. a switch for selectively inducing an electromagnetic field in the smart fluid thereby changing the state of the fluid and causing the first element to couple to the compatible element uniformly along the predetermined length; and
wherein the first element includes an internal void and wherein the smart fluid located in the void and the first switch creates a magnetic field that magnetizes the smart fluid thereby creating magnetic forces that attract the first element and the second element together.

23. A releasable closure for inhibiting access to an opening, comprising:
   a substrate material defining an opening;
   an overlying material that can inhibit access to the opening; and
   a closure element coupled to the overlying material, the closure element having a smart fluid therein wherein the closure element is relatively rigid when the smart fluid is magnetized and access to the opening is more inhibited, and the closure element is relatively compliant when the smart fluid is not magnetized and access to the opening is less inhibited.

* * * * *